Figure 1:
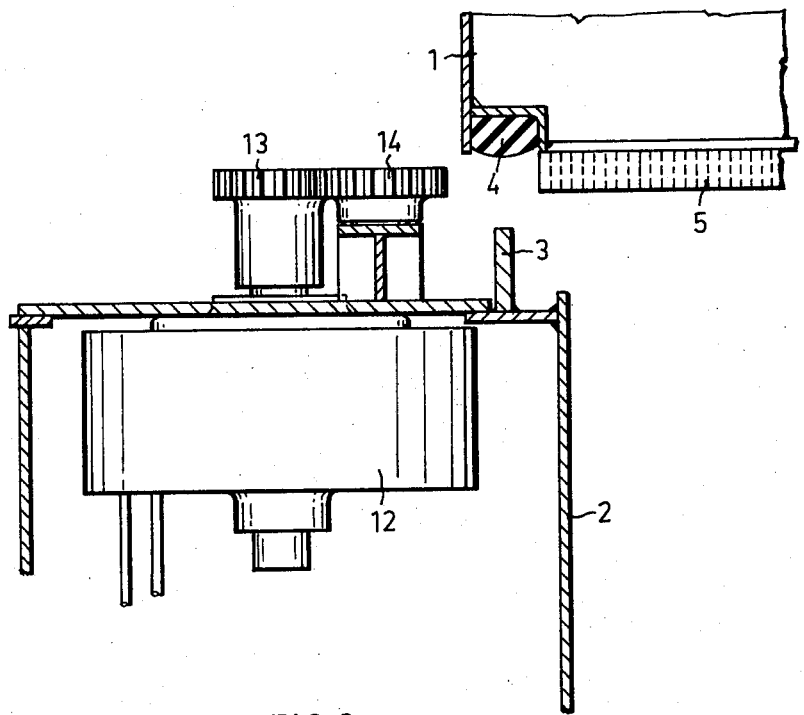

United States Patent [19]
Ansund

[11] 3,708,914
[45] Jan. 9, 1973

[54] HATCH COVER DRIVE MEANS
[75] Inventor: Bo Kent Ansund, Goteborg, Sweden
[73] Assignee: MacGregor International S.A., Basel, Switzerland
[22] Filed: Oct. 12, 1971
[21] Appl. No.: 188,285

[30] Foreign Application Priority Data
Oct. 16, 1970 Sweden..........................13993/70

[52] U.S. Cl....................................49/209, 114/201
[51] Int. Cl.........................B63b 19/18, E05f 15/14
[58] Field of Search..................49/209–211, 221; 114/201, 202

[56] References Cited
UNITED STATES PATENTS

| 2,722,413 | 11/1955 | Coors | 49/221 |
| 3,175,519 | 3/1965 | Warheit | 114/201 R X |
| 3,423,877 | 1/1969 | Merry | 49/211 |

FOREIGN PATENTS OR APPLICATIONS

| 695,663 | 8/1953 | Great Britain | 114/201 |

Primary Examiner—J. Karl Bell
Attorney—S. Delvalle Goldsmith et al.

[57] ABSTRACT

In a drive means for hatch covers of the type in which hatch cover sections are movable laterally or longitudinally by means of a rack arranged beneath the hatch cover section, said rack co-operating with a drive motor located externally of the hatch coaming, the improvement that the drive means includes two pinions, one of which in the closed position of the hatch cover engages a rack element on the outside of the hatch cover section, while the other pinion is arranged to co-act with the rack subsequent to a limited movement of said hatch cover section, and which rack extends at most to a hatch packing inserted in the lower surface of the hatch cover section.

5 Claims, 5 Drawing Figures

PATENTED JAN 9 1973

3,708,914

PATENTED JAN 9 1973 3,708,914

SHEET 2 OF 2

HATCH COVER DRIVE MEANS

The present invention relates to drive means for hatch covers of the type in which the hatch cover sections may be raised and lowered and moved in a horizontal plane, normally in the longitudinal direction of a ship or transversely thereof, and in which drive means includes at least one rack mounted on the lower surface of the hatch cover section and a rotary motor which is located externally of the hatch coaming and which has mounted on its output shaft a gear arranged to co-act with the rack. Since in an arrangement of this kind the rack must be made to extend beyond the end of the hatch cover section, it is necessary to ensure that the hatch packing arranged along the edge of the lower surface of the hatch cover section can pass continuously beyond the rack. For the purpose of satisfying this requirement, proposals have been made whereby the pitch of the teeth on the rack and the width of the packing are adjusted in a manner to permit the packing to pass between two adjacent rack teeth. The disadvantage with such an arrangement, however, is that the width of the hatch packing is restricted to the greatest tooth pitch which can be feasibly applied in practice. It will be readily understood that teeth having a great pitch will be subjected to excessive moments and that the driving motor will be exposed to high loads.

The present invention relates to an improvement in hatch cover drive means of the type described which enables the pitch of the teeth on the rack and the width of the packing to be arbitrarily selected, while at the same time enabling the path travelled by the hatch cover section to be extended without it being necessary to extend the rack beyond the side of the ship.

The invention is mainly characterized by the fact that the hatch cover drive means includes two pinions, one of which engages in the closed position of the hatch cover a first rack mounted on the outer surface of the hatch cover section, while the other pinion is arranged to co-act with a second rack mounted on the lower surface of the hatch cover subsequent to the hatch cover section having been moved a short distance, and wherein the second rack extends at most to the hatch packing inserted in the lower surface of the hatch cover section.

The two pinions may be arranged to engage each other in a manner such that a pinion mounted on the shaft of the drive motor drives the other pinion, the said other pinion being placed closer to the edge of the hatch cover section than said first pinion and suitably in a position such that a vertical plane passing through the axes of the pinions lies obliquely to the hatch cover section. In this way the first rack on the outside of the hatch cover section will co-act with the pinion on the motor shaft on the side which projects laterally of the inner pinion, while the second rack on the lower surface of the hatch cover section co-acts with the inner pinion on its opposite side. The first and second racks are therefore laterally displaced in respect to each other and optionally also vertically.

In accordance with another embodiment of the invention, said first rack may be pivotally mounted on the outer surface of the hatch cover section and be actuated by means, for example, of a spring which attempts to force the first rack to take a position along the side of the hatch cover section immediately the first rack is disengaged from its associated pinion subsequent to movement of the hatch cover through a certain distance in the opening direction.

Figure 2:
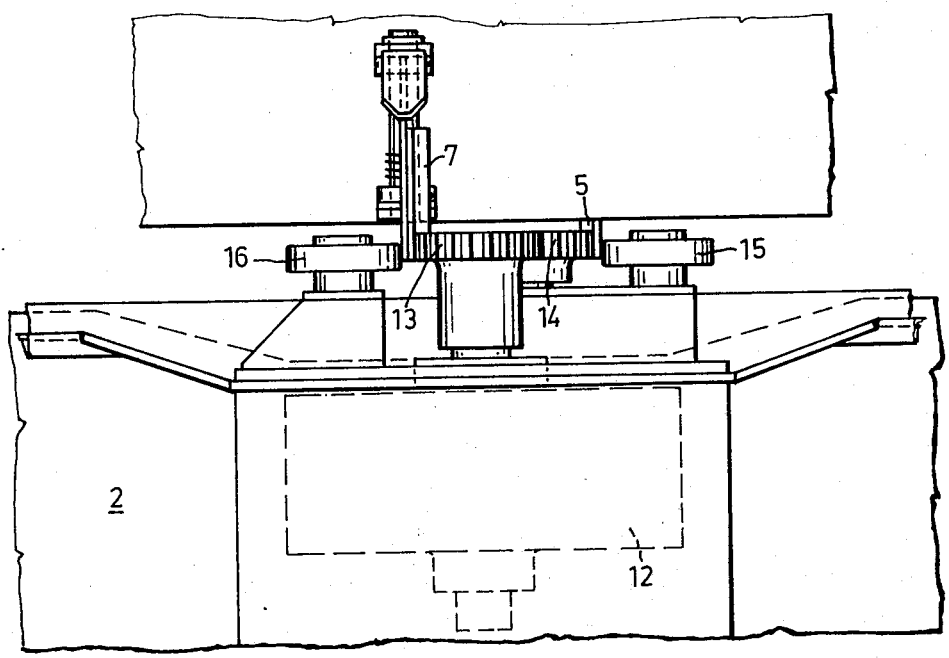
Figure 3:
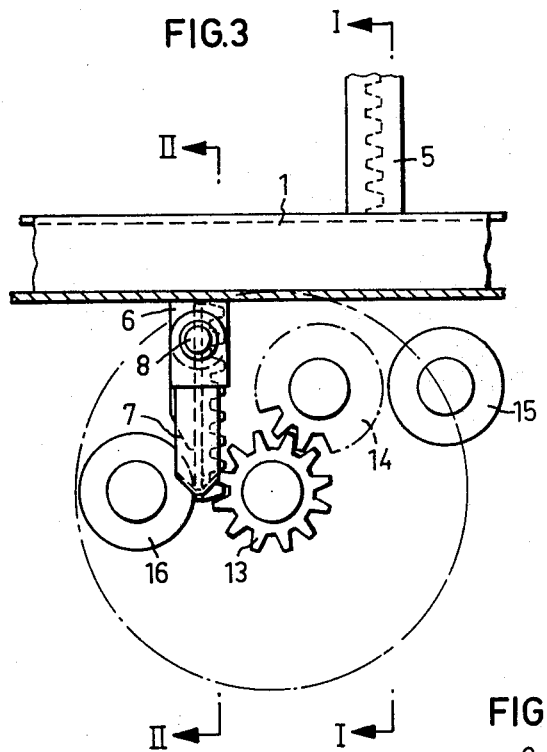
Figure 4:
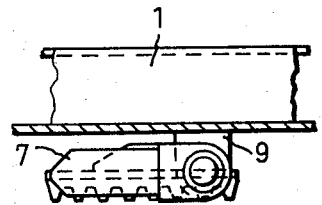
Figure 5:
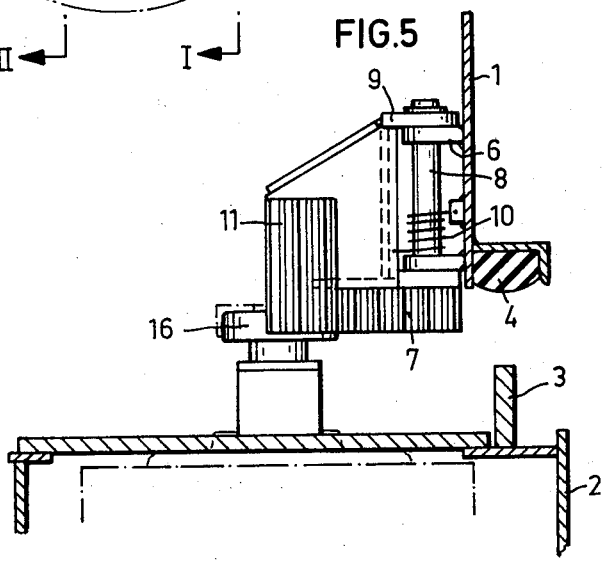

The invention will now be described in detail with reference to the accompanying drawing, in which FIG. 1 is a cross section along the line I—I in FIG. 3, showing a portion of a hatch cover section and a hatch coaming having a drive motor mounted thereon, FIG. 2 is a side view from the left in FIG. 1, FIG. 3 is a diagrammatic horizontal section through the lower portion of the hatch cover section with an outer first rack in engagement with a pinion on the drive motor, FIG. 4 is a part sectional view of FIG. 3, with the first rack in a collapsed position, and FIG. 5 is a cross section similar to FIG. 1 along the line V—V in FIG. 3 through the attachment of the outer first rack.

The drawing illustrates a hatch cover section 1 which can normally be moved transversely of a ship, transport container or other storage space. One or more hatch cover sections 1 are intended to cover the area within a hatch coaming 2, the upper surface of which is shaped to a roller track for rollers on the hatch cover sections, and means are provided for lifting the closed hatch cover from a sealing bar 3 mounted on the coaming. Resting on the sealing bar 3 in the closed position of the hatch cover is a packing 4 arranged around the lower surface of the hatch cover section 1. A rack 5 provided with vertically extending teeth is mounted on the lower side of the hatch cover section parallel with the path of movement of the hatch cover section. The rack 5 suitably extends up to the attachment means of the packing 4 which may have arbitrary width. Securely attached to the outside of the hatch cover section 1 as by welding is an attachment means 6 for a further rack 7 which, when the hatch is closed, projects outwardly, said attachment means forming a bearing for a vertical journal pin 8 on which bearing plates 9 attached to the rack 7 are pivotally mounted. Surrounding the pivot pin 8 is a spring 10, one end of which is attached to the hatch cover section and the other end of which is connected to the rack means 7. The teeth of the rack means 7 are lengthened at the front, free end of the rack as shown at 11 for a purpose described hereinafter.

A rotary motor 12, which may be driven hydraulically, electrically or in some other appropriate manner, is suitably mounted within the coaming 2, the rotating shaft of the motor extending vertically and being provided at its upper end with a pinion 13 which has the same gear pitch as that of the rack means 7 and which is in meshing engagement with the rack means 7 and with a second pinion 14 laterally displaced with respect to and closer to the hatch cover section 1 in the closed position of said hatch cover than the pinion 13, the pinion 14 being positioned so that its teeth are able to engage the teeth on the rack 5 when the hatch cover section is moved outwardly to a sufficient extent. The hatch cover section 1 is guided by means of a guide roller 15 placed on the coaming 2 opposite the pinion 14 in a manner such that a line between the geometric axes of the pinion 14 and the guide roller 15 extends parallel with the edge surface of the hatch cover section 1. A guide roller 16 is placed opposite the pinion 13 in a similar manner. The guide rollers 15 and 16 are arranged to co-act with the rear side of the racks 5 and 7.

The arrangement operates in the following manner. When closed, the hatch cover occupies a lowered position in which the packing 4 rests on the bar 3 and the upper parts of the lengthened teeth 11 of the rack 7 are in engagement with the pinion 13, the rack 7 being held in an outwardly pivoted position at right angles to the hatch cover section 1 by means of the guide roller 16 against the action of the spring 10. Prior to opening the hatch, the hatch cover section is slightly raised so that the packing 4 and the rack 5 are free from the bar 3, whereby engagement of the teeth portion 11 of the rack 7 with the pinion 13 is moved to the lower portion of the rack 7, as illustrated in FIG. 5. Upon starting the motor 12, rotation of the pinion 13 and thereby simultaneously the pinion 14 will draw the hatch cover section 1 outwardly by means of the rack 7 through a distance which enables the teeth of the rack 5 to be engaged by the teeth of the pinion 14. When the rack 7 has passed completely through the space between the pinion 13 and the guide roller 16, the spring 10 will begin to swing the rack 7 to one side until it finally lies parallel with the edge surface of the hatch cover section 1, as shown in FIG. 4, and projects slightly outside the hatch cover when said hatch is open. Meanwhile, the motor 12 in cooperation with the pinion 14 engaged with the rack 5 has moved the hatch cover section 1 horizontally to expose the hatch opening.

The hatch is closed by the reverse procedure. The drive motor 12 is reversed so that the pinions 13 and 14 rotate in the opposite direction, whereby the first pinion 14 and the rack 5 move the hatch cover section inwardly. When the hatch cover section has moved to such an extent that the collapsed rack 7 engages the guide roller 16, the rack 7 is moved outwardly until it finally adopts a position perpendicular to the hatch cover section and simultaneously tensions the spring 10. Before the rack 5 is disengaged from the teeth of the pinion 14, the teeth of the rack 7 mesh with the teeth of the pinion 13 and is operative in moving the hatch cover section 1 through the final stages of its closing movement.

Since the two racks 5 and 7 operate substantially independently of each other, the gap between their opposing ends at right angles to the edge surface of the hatch cover section 1 may be of arbitrary size, which means that the width of the intermediate packing 4 may be selected such as to give the packing optimum sealing and load properties. At the same time, the pitch of the teeth of the racks and pinions may be kept small so that the hatch cover section is able to move smoothly and so that the load on the teeth and the components of the motor is as low as possible.

It will readily be perceived that the concept of the present invention is not restricted to the described embodiment but that various embodiments can be made. Thus, the pitch of the teeth may be different for the gears. For example, a gear having a different pitch than that of the pinion 13 may be mounted on the shaft of the pinion 14 and instead of co-operating with said pinion may be arranged to co-operate with the rack 5 which of course in that case would have the same pitch as said first-mentioned gear. It is also possible to arrange separate motors for the pinions 13 and 14, in which case the pinions need not be in meshing engagement with each other and may have different pitches.

What I claim is:

1. A drive means for hatch covers comprising hatch cover sections movable on a hatch coaming, at least one rack arranged beneath the respective hatch cover sections and at least one drive motor located externally of the hatch coaming, said drive means including a first pinion and a second pinion driven by said drive motor and a rack element, one of said pinions in the closed position of the hatch cover being in engagement with said rack element arranged on the outside of the hatch cover section, the other pinion being arranged to co-act with said rack subsequent to a limited degree of movement of said hatch cover section, said rack extending at most to a hatch packing inserted in the lower surface of the hatch cover section.

2. A drive means as claimed in claim 1, characterized in that the first and second pinions are in engagement with each other and positioned so that a vertical plane passing through the axes thereof lies obliquely to the edge surface of the hatch section, the first pinion in the closing position of the hatch cover being in engagement with the rack element.

3. A drive means as claimed in claim 2, characterized in that the rack element is arranged to co-operate with its pinion on the side which laterally projects beyond the second pinion, while the rack is arranged to engage the second pinion on the opposite side of the rack element.

4. A drive means as claimed in claim 1, characterized in that the rack element is pivotally mounted on a vertical shaft and is biassed by spring means, which attempts to swing said rack element towards the hatch section.

5. A drive means as claimed in claim 1, characterized in that said second pinion has a gear securely connected thereto and arranged concentrically therewith, said gear being arranged to co-act with the rack and being provided with a pitch different from that of the first pinion.

* * * * *